May 2, 1961
P. G. MUELLER
2,982,307
TIME CONTROLLED VALVE
Filed June 22, 1959
2 Sheets-Sheet 2
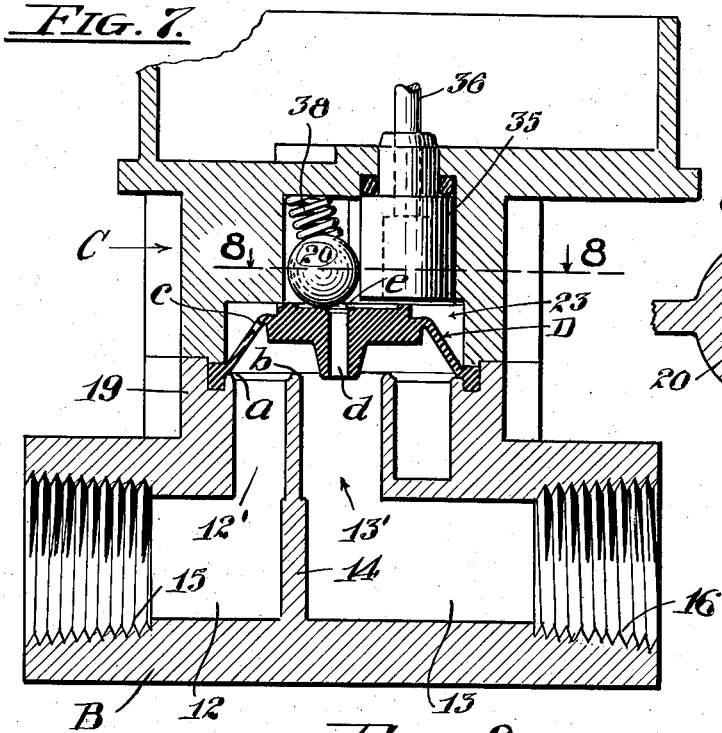
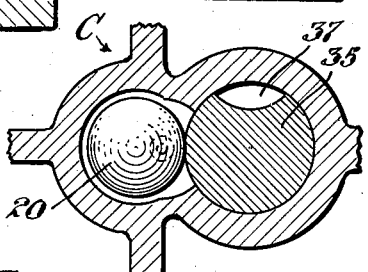
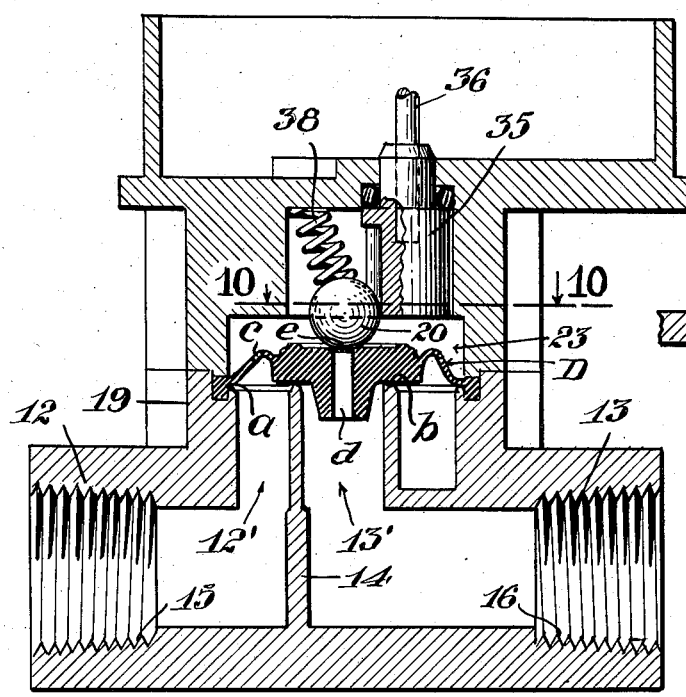
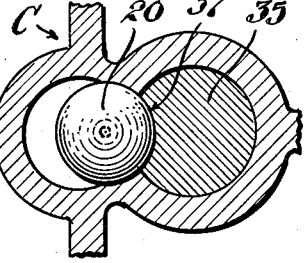
INVENTOR
Paul G. Mueller
By
ATTORNEY

United States Patent Office 2,982,307
Patented May 2, 1961

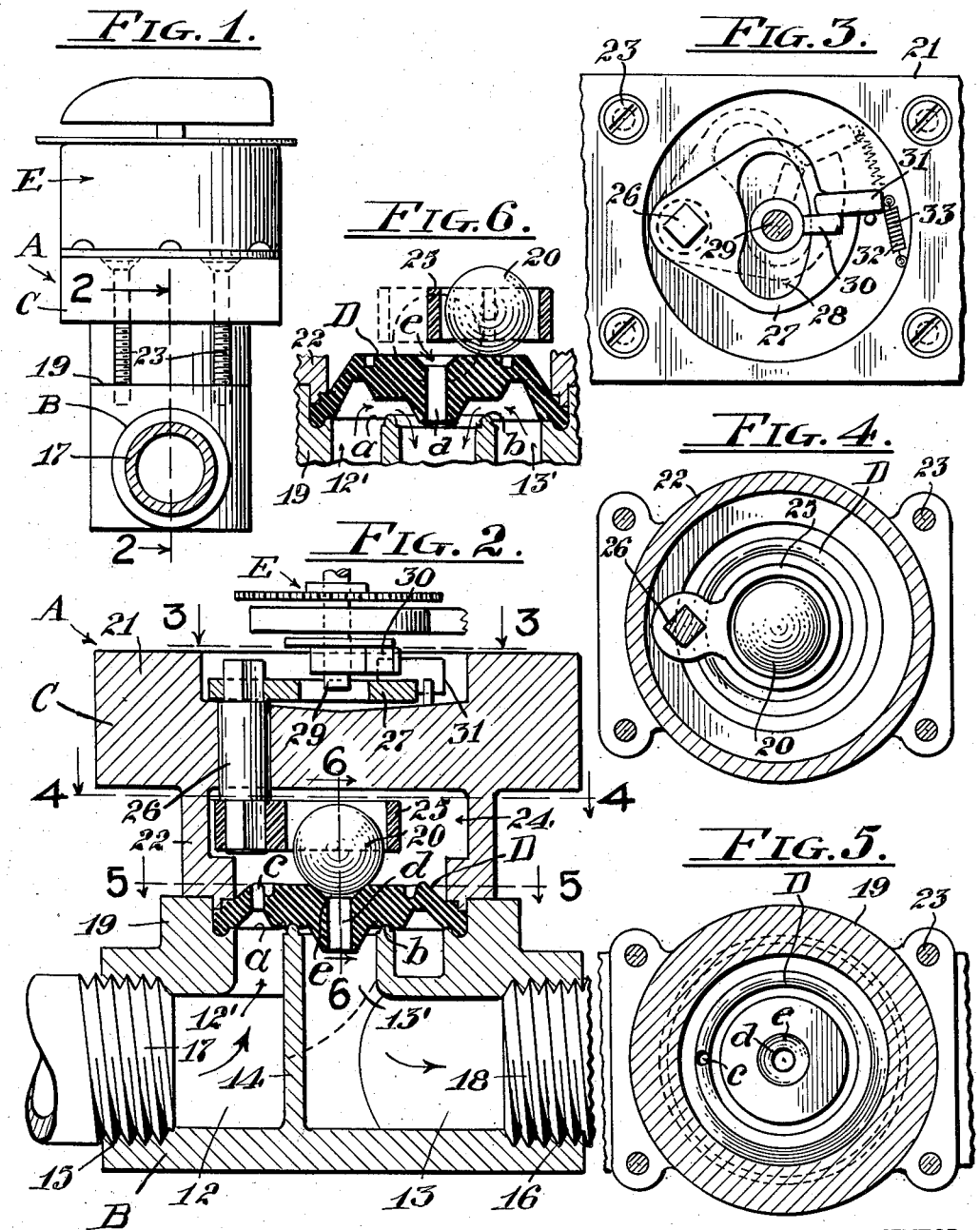

2,982,307

TIME CONTROLLED VALVE

Paul G. Mueller, 13746 Sunset Blvd.,
Pacific Palisades, Calif.

Filed June 22, 1959, Ser. No. 821,898

1 Claim. (Cl. 137—624.15)

This invention relates to a valve and more particularly pertains to a valve which is adapted to be automatically opened and closed at certain predetermined intervals by a timing mechanism and which is especially applicable for use in timing the operations of water softeners, sprinkling systems and the like.

The primary object of the invention is to provide a valve of the above character which is highly dependable and efficient in its operations, and wherein parts subject to wear are readily replaceable and are not subject to the corrosive action of water.

Another object is to provide a valve of the above character which is composed of few parts of simple construction and not liable to get out of order.

Another object is to provide a valve in which a flexible diaphragm valve is normally disposed in a closed position under the thrust of liquid pressure on top thereof, and is moved to its open position by liquid pressure imposed on the under side thereof on relieving the liquid pressure on the top thereof, and further to provide an automatically controlled means for controlling said liquid pressure.

A further object is to provide a ball valve arrangement for controlling the above recited liquid pressures embodying means actuated by a timing mechanism for shifting a ball valve relative to a seat in opening and closing a pressure relief passage.

With the foregoing objects in view together with such other objects and advantages as may subsequently appear, the invention resides in the parts and in the combination, construction and arrangement of parts hereinafter described and claimed, and as illustrated by way of example in the accompanying drawing, in which:

Fig. 1 is a view in side elevation of the timing valve;

Fig. 2 is an enlarged vertical section and elevation as seen on the line 2—2 of Fig. 1 showing the valve in its closed position;

Fig. 3 is a horizontal section and plan view taken on the line 3—3 of Fig. 2;

Fig. 4 is a horizontal section and plan view as seen on the line 4—4 of Fig. 2;

Fig. 5 is a horizontal section and plan view taken on the line 5—5 of Fig. 2;

Fig. 6 is a detail in vertical section taken on the line 6—6 of Fig. 2 showing the valve in its open position;

Fig. 7 is a view in vertical section an elevation showing a modified form of the invention, with the valve in its open position;

Fig. 8 is a detail in horizontal section taken on the line 8—8 of Fig. 7;

Fig. 9 is a view similar to Fig. 7 showing the valve in its closed position; and Fig. 10 is a horizontal section as seen on the line 10—10 of Fig. 9.

Referring to the drawings more specifically in which corresponding reference characters indicate corresponding parts through the several views, A indicates generally a valve housing which embodies lower and upper members B and C respectively of which the lower member B comprises a tubular fitting having inlet and outlet passages 12 and 13 separated at their inner ends by a septum 14 and having internally threaded outer end portions 15—16 for engagement with intake and discharge pipes 17—18.

The inner ends of the passages 12 and 13 open upwardly through passages 12' and 13' extending through a boss 19 on the member B, the passages 12'—13' leading through annular rims a—b slightly countersunk relative to the outer face of the boss 19 and of which the rim b constitutes a valve seat.

Mounted on the boss 19 and seated on the rims a—b is a flexible resilient diaphragm D constituting a valve, which diaphragm has a restricted port c leading therethrough from the passage 12' and also has a passage d leading axially therethrough from the passage 13'. The passage d has a valve seat e on its upper end adapted to receive a ball valve 20 which is adapted to be rolled on and off the seat e as will be later described.

The upper valve body member C comprises a block 21 having on its underside a hollow boss 22 which seats on the boss 19 in clamping engagement with the margin of the diaphragm D, the block 21 of the member C being secured to the member B as by screws 23 as indicated in Fig. 1. The boss 22 encloses a chamber 24 which overlies the major central portion of the diaphragm D which chamber houses the ball valve 20 and an actuator therefor.

The above recited construction is common to both forms of the invention set forth in the drawings, which forms differ from each other primarily as to the mode of actuating the ball valve.

In the form of the invention set forth in Figs. 1 to 6 inclusive, the actuator of the ball valve 20 comprises an arm 25 fixed on the lower end of a rock-shaft 26 and extending upward through the block 21, the arm 25 being in the form of an annulus which loosely encircles the ball valve 20 as shown in Fig. 4. The upper end of the rock-shaft 26 has fixed thereon an arm 27 having an arcuate slot 28 into which freely extends the lower end of a vertically extending rotary driven shaft 29 of a timing mechanism E such as a clock which shaft has a lateral lug 30 thereon adapted on each revolution of the shaft to engage a lug 31 on the arm 27 to advance the latter from its retracted position shown in full lines in Fig. 3 to its advanced position as indicated in dotted lines, the arm 27 being advanced in opposition to a spring 32 until the lug 30 rides free of the lug 32 to allow the spring 32 to restore the arm 27 to its retracted position against a stop 33.

In the operation of the invention above described when the arm 27 is in its retracted position as shown in Fig. 3 the ball valve 20 will be disposed in its seated position on the valve seat e as shown in Figs. 2 and 4 thereby closing the passage d. Liquid under pressure from the passages 12—12' seeping through the restricted port c will then impose pressure upon the upper side of the diaphgragm D thereby tightly seating the latter on the rim b so as to prevent the passage of liquid from the intake passages 12—12' to the discharge passages 13—13'.

When the timing shaft 29 acts to swing the arm 27 laterally as indicated in dotted lines in Fig. 3, the shaft 26 and arm 25 will be turned laterally so as to move the ball valve 20 off the seat e thereby relieving the water pressure above the diaphragm D such that excess water pressure from the passages 12'—12' will then act to distend the diaphragm D upwardly as indicated in Fig. 6, thereby opening communication between the passages 12—13' over the rim b. During the interval the ball valve 20 is thus disposed off its seat the valve proper will be maintained open so that water may flow freely therethrough. Upon the arm 27 being restored to its normal position which occurs on disengagement of the lugs 30 and 31 relative to each other, the ball valve 20 will be restored to its closed position such that water pressure will equalize on opposite sides of the diaphragm D such that the latter under its inherent resiliency will assume its closed position, whereupon liquid pressure will then again build up above the diaphragm so as to retain it in its seated position.

In the form of the invention shown in Figs. 7 to 10 inclusive, the ball valve actuator comprises a vertically disposed cylindrical head 35 disposed in the chamber 23 and mounted on the driven shaft 36 of a suitable timing mechanism, such as a clock. The head 35 is formed on a side portion thereof with a longitudinally extending channel 37 of arcuate cross section adapted, on rotation of the head 35, to be presented toward the ball valve 20 so that the valve will be urged inwardly into the channel 37 by a spring 38 bearing thereagainst. When thus positioned the ball valve will be disposed on its seat $e$ to thereby close the passage $d$ such that liquid pressure will build up above the diaphragm D through the port $c$ to advance the diaphragm D to its closed position as shown in Fig. 9, in the manner described with reference to the previously recited form of the invention.

On rotating the head 35, ball valve 20 will be moved off its seat as shown in Figs. 7 and 8 to thereby vent the liquid under pressure from above the diaphragm D thereby permitting liquid pressure beneath the diaphragm to effect elevation thereof, as shown in Fig. 7, thus opening the valve and permitting the flow of liquid therethrough; the valve closing when the cylindrical head 35 is turned to a position to permit the ball valve to ride into the channel 37.

In each form of the invention set forth it is essential that the valve controlled passage $d$ in the diaphragm D be of a cross sectional area considerably larger than that of the restricted port $c$ in order to allow water to escape faster through the passage $d$ when valve 20 is open than it can flow through the port $c$, thereby permitting the diaphragm D to lift off its seat.

While specific embodiments of the invention have been shown and described, the invention is not limited to the exact details of construction set forth, and the invention embraces such changes, modifications and equivalents of the parts and their formation and arrangement as come within the purview of the appended claim, for example, while the valve 20 and diaphragm D are set forth as being normally disposed in their closed position, it is manifest that they may be normally open and closed at time intervals by the timing mechanism E.

I claim:

In a time controlled valve, a valve housing embodying abutting lower and upper members, means demountably clamping said members together, said lower member having inlet and outlet passages having upwardly opening inner ends leading through spaced concentric substantially coplanar annular rims of which the inner rim borders the inner end of the outlet passage and constitutes a valve seat, a resilient diaphragm valve normally seated on said rims having its margin clamped between said lower and upper members, said upper member having a chamber overlying the major central portion of said diaphragm valve, said diaphragm valve having a restricted opening therethrough leading from the inner end of said inlet passage to said chamber and having a central opening leading from said chamber to the inner end of outlet passage, a ball pilot valve in said chamber seated on said diaphragm valve and adapted to open and close said central opening, and time controlled means in said chamber above said diaphragm valve engaged with said ball valve operable to roll it on the upper face of said diaphragm in and out of a position closing said central opening.

References Cited in the file of this patent

UNITED STATES PATENTS

| 1,725,280 | Kiefer | Aug. 20, 1929 |
| 1,808,989 | Langdon | June 9, 1931 |
| 2,650,059 | Hjulian | Aug. 25, 1953 |
| 2,762,602 | St. Clair | Sept. 11, 1956 |

FOREIGN PATENTS

| 29,685 | Australia | of 1931 |